J. F. GOUNLEY.
APPARATUS FOR BACKING ELECTROTYPE SHELLS.
APPLICATION FILED DEC. 8, 1913.

1,219,289.

Patented Mar. 13, 1917.
4 SHEETS—SHEET 1.

INVENTOR
James F. Gounley.

WITNESSES

BY

ATTORNEY

J. F. GOUNLEY.
APPARATUS FOR BACKING ELECTROTYPE SHELLS.
APPLICATION FILED DEC. 8, 1913.

1,219,289.

Patented Mar. 13, 1917.
4 SHEETS—SHEET 4.

INVENTOR
James F. Gounley.

WITNESSES

BY

ATTORNEY

UNITED STATES PATENT OFFICE.

JAMES F. GOUNLEY, OF PHILADELPHIA, PENNSYLVANIA, ASSIGNOR, BY MESNE ASSIGNMENTS, TO THE RAPID ELECTROTYPE COMPANY, OF CINCINNATI, OHIO, A CORPORATION OF OHIO.

APPARATUS FOR BACKING ELECTROTYPE-SHELLS.

1,219,289.  Specification of Letters Patent.  Patented Mar. 13, 1917.

Application filed December 8, 1913. Serial No. 805,243.

*To all whom it may concern:*

Be it known that I, JAMES F. GOUNLEY, a citizen of the United States, and a resident of Philadelphia, county of Philadelphia, and State of Pennsylvania, have invented certain new and useful Improvements in Apparatus for Backing Electrotype-Shells, whereof the following is a specification, reference being had to the accompanying drawings.

This invention particularly relates to apparatus for backing electrotype shells, and to the method of employing the same, and is especially directed to the art of making plates for printing purposes.

The object of this invention, is to provide an apparatus having a rotatable support or table for carrying the electrotype molds in a circular path and successively presenting them into operative registration with heating means and into adjacent relation with a melting pot and into operative registration with carrying means. Other objects of my invention are to provide an apparatus for backing electrotype shells which is compact; to provide an apparatus which is easy to operate; and to provide an apparatus which may be substantially continuously operated. My invention also comprehends the method of backing electrotype molds which consists in placing an electrotype shell face downward in a mold or pan, placing a suitable flux on the back of said shell, dry heating said mold or pan and shell to melt the flux, pouring molten metal in said pan over the back of said shell and then cooling said molten metal.

This invention also includes all the various novel features of construction and arrangement hereinafter more definitely specified.

Figure 1:
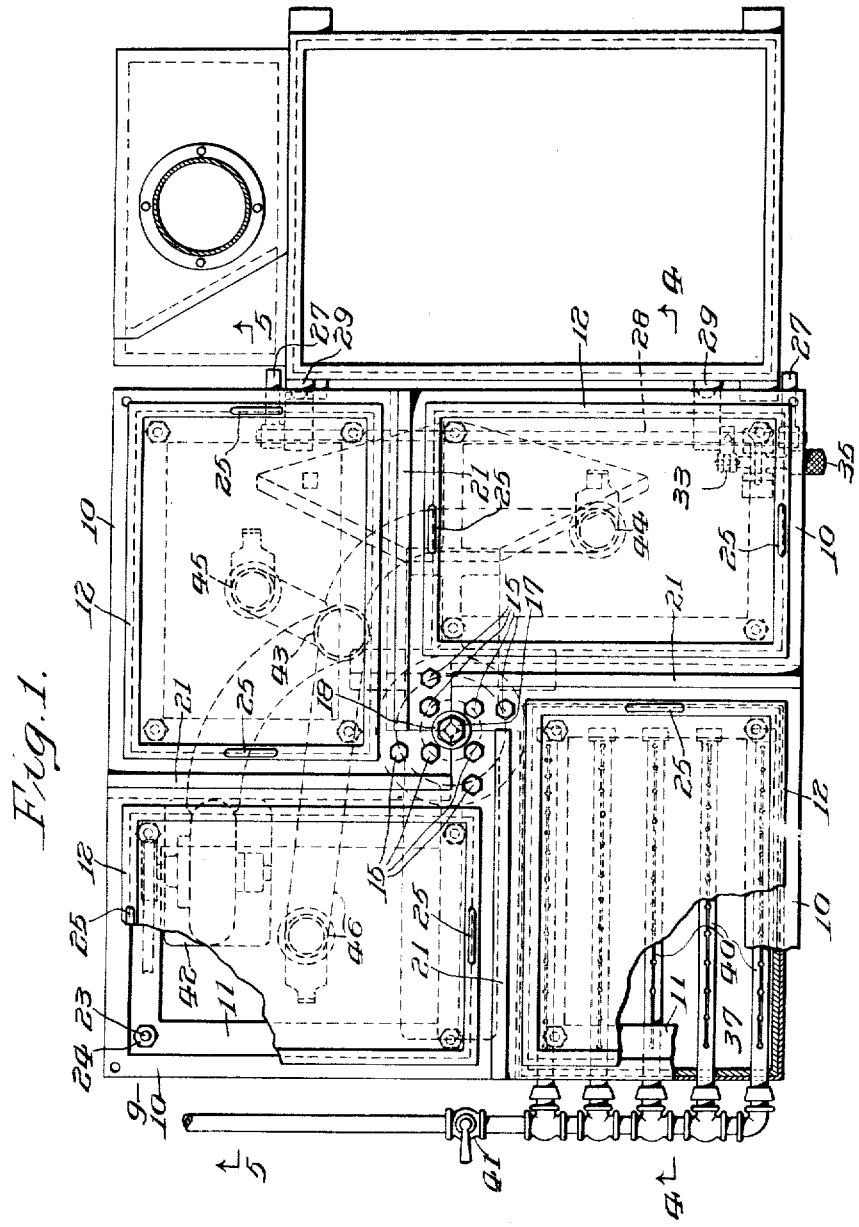
Figure 2:
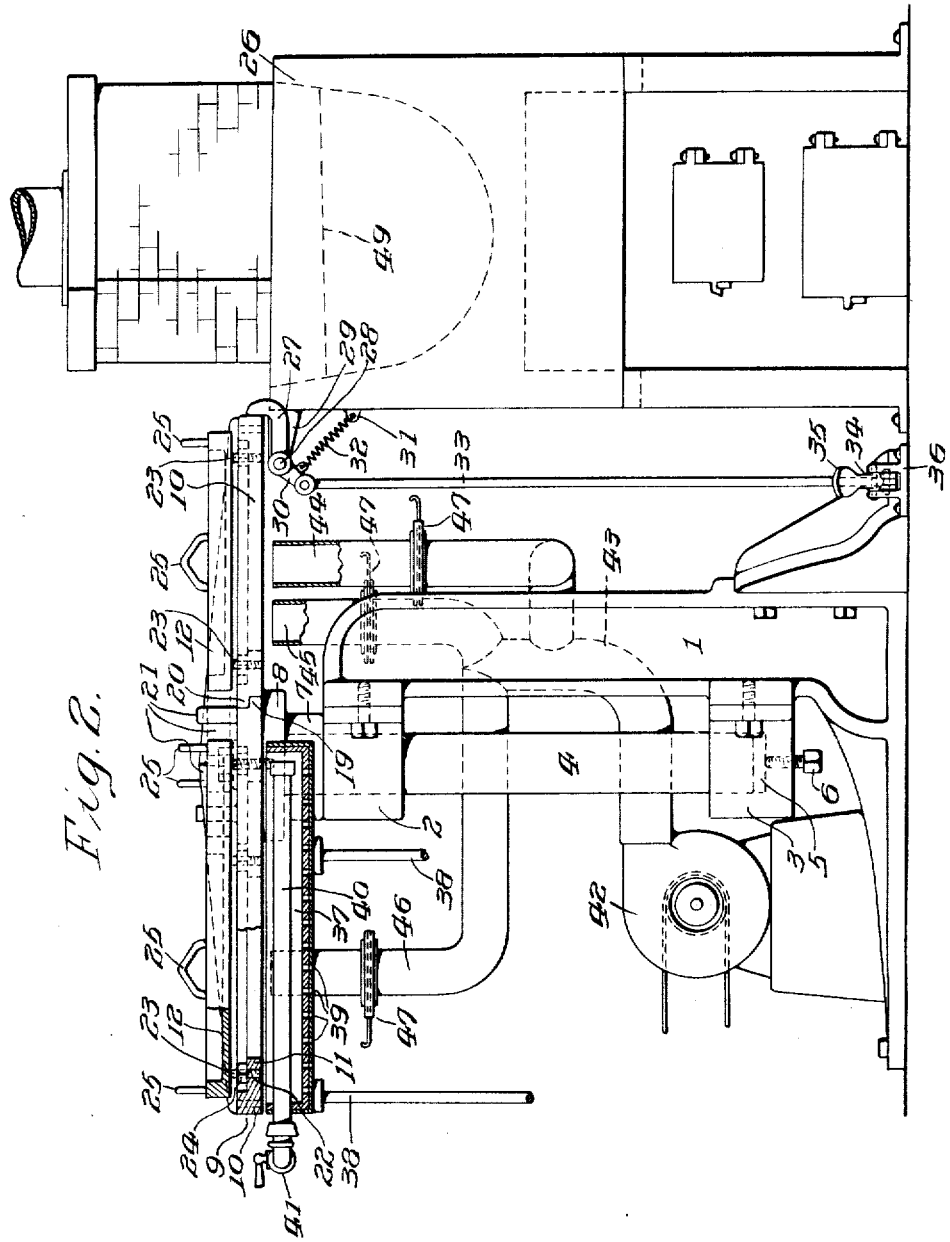
Figure 3:
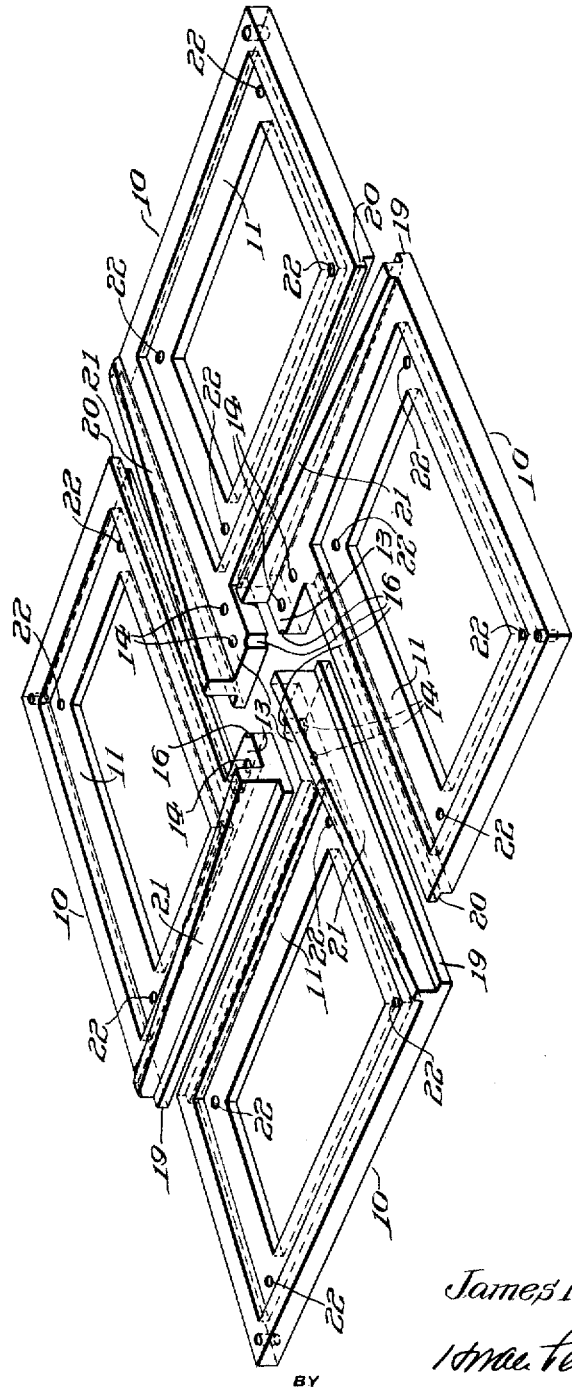
Figure 4:
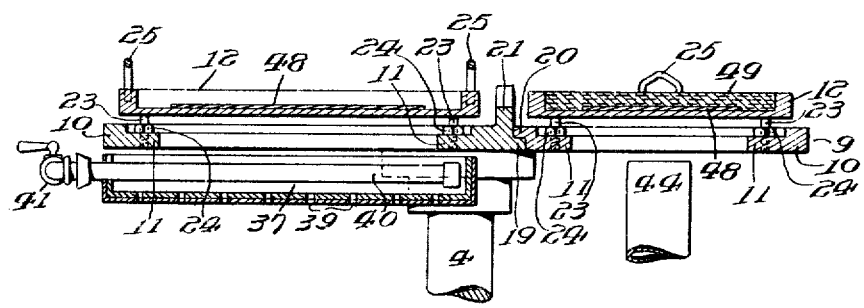
Figure 5:
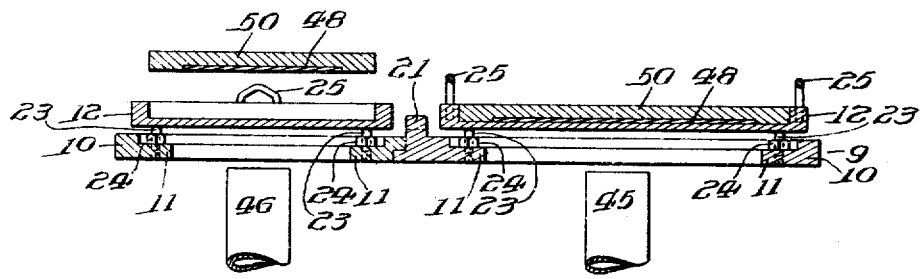

In the accompanying drawings, Figure 1 is a plan view of an apparatus constructed in accordance with this invention; Fig. 2 is substantially a side elevational view, a small part of the apparatus, however, being shown in section, for the purpose of clearly illustrating the construction; Fig. 3 is a perspective view of the four forms which go to make up the table of the apparatus, said forms being slightly separated each from the other in order to illustrate the shape of each form and the manner in which they are assembled in securing the same to the support by means of which they are rotated; and Figs. 4 and 5 are sectional views, partly diagrammatic, taken on the lines 4—4 and 5—5 respectively of Fig. 1 and showing the four operations to which the electrotype or shell is subjected in its treatment in the apparatus above described, and also illustrating what is being accomplished in each of the four pans simultaneously.

In the drawings the same reference numerals are used throughout the various views to designate the same parts. The apparatus consists of a pedestal or upright support 1 upon the side of which are journal boxes 2 and 3, each respectively bolted to said pedestal as indicated in Fig. 2. In said journal boxes is journaled a vertical shaft 4 supported upon a stepped bearing 5 in said journal box 3, said stepped bearing being vertically adjustable by means of the adjusting screw 6.

The upper end of said shaft 4 is provided with a collar 7, having at its top a flange 8 to which is secured the table 9.

The table 9 consists of four substantially rectangular frames 10 of cast iron or other suitable metal and each is provided with an inwardly extending flange 11, the top surface of which is below the plane of the top surface of the frame proper. The four frames 10 fit together closely, as shown in Fig. 1, to form a continuous substantially rotatable square table arranged to support or contain four pans 12, referred to again below. One of the short sides of each of the frames 10 is extended beyond the border of one of the adjacent long sides of the frame to form a projection or tongue 13 which is provided with two holes 14 through which bolts 15 are arranged to pass for the purpose of securing these four frames rigidly to the flange 8 of the collar 7. These projections 13 are substantially as long as they are wide, so that when the said frames are arranged closely together, the end of each tongue abuts against the side of the tongue of the adjacent frame. That corner 16 of each of the tongues which are nearest together at the center of the table when the frames 10 are assembled, is preferably beveled or otherwise cut off, to allow a large bolt 17 to pass between said frames, said bolt being screwed in the upper end of the shaft 4, and said bolt is preferably provided with a large head or washer 18, which overlies the corner of each frame, said bolt acting as an additional means of rigidly securing the frames 10 to the shaft 4 and collar 7.

That side of each frame which is provided with the extension 13 is also preferably provided with a narrow flange or tongue 19 throughout its length, the height of the flange being substantially one half of the thickness of the frame 10, and the lower side of said flange 19 being preferably in the plane of the undersurface of the frame 10. That long side of each of the frames 10 which is adjacent the tongue or projection 13 of each frame is also preferably provided with a narrow flange or tongue 20 extending up to the projection 13 of that frame, said flange 20 being also in width equal to substantially one half of the thickness of the main or body portion of the frame and the upper side of said flange 20 being substantially in the plane of the top surface of the frame. When the frames are closely assembled and fitted together in the manner shown in Fig. 1, the flange 19 of one frame will serve as a support upon which the flange 20 of the adjacent frame rests. These flanges 19 and 20, are clearly illustrated in Fig. 3. That short side of each of the frames which is provided with the projection 13, is also provided with a longitudinal rib 21, preferably highest at the end of the tongue or projection and gradually decreasing in height throughout its length, as is clearly shown in Fig. 3, for the purpose of stiffening the frame at the point of its attachment to the flange 8 and for positioning the molds on the frame.

In the four corners of the flange 11 of each frame, are preferably provided threaded holes 22 for the reception of pan or mold supporting screws 23 which may be adjusted to extend upwardly above the surface of the flange 11 and preferably above the plane of the upper surface of each frame, as shown in Fig. 2 and locked in such position by means of locking nuts 24. The pans 12 are arranged to be supported on the tops of the adjusting supporting screws 23 and are preferably provided with handles 25 by means of which the pans may be lifted from or placed upon the table. Preferably located closely adjacent the rotatable table 9, is a melting pot 26, from which molten metal may be dipped by the operator and poured into the pans 12 as required. I preferably arrange on that side of the apparatus adjacent said melting pot 26, a stop and locking mechanism, whereby the table, after having been rotated through a quadrant, may be locked in that position until it is desired to impart to it a further rotative movement as will be further described. Said locking mechanism comprises two locking dogs or fingers 27, radially secured to a shaft 28 which is journaled in suitable brackets 29. Secured to a lever 30 also radially secured to said shaft 28 and also attached to a fixed lug 31, is a spring 32 tending to swing said dog about its pivot and to hold the locking finger of said dog in its uppermost position. Extending from said lever 30 downwardly, is preferably arranged a stiff connecting rod 33, pivoted at one end to a foot lever 34, the opposite end of which foot lever is provided with a pedal 35. Said foot lever 34 may be pivoted in any suitable bracket 36, as clearly indicated in Figs. 1 and 2. When the foot of the operator is off the pedal 35, the spring 32 will hold the locking dogs up against the adjacent side of the table 9.

The foot lever 34 is preferably arranged in a position with respect to the table most convenient to the operator, and, therefore, the side of the apparatus where the operator is located during the manipulation of the apparatus heretofore described will be hereafter termed for convenience, the front side of the apparatus and the front side of the table is substantially in alinement with the front side of the melting pot.

Arranged to comprise substantially one quadrant of the table 9 and preferably below that frame which forms the left hand side of the table looking from the front of the apparatus is a heater. Any heater may be employed for the purpose of heating that pan which at any particular time is directly over and in registration with the heater, but in practice, I prefer to use a gas heating apparatus similar to that shown in Figs. 1 and 2. For that purpose, I preferably provide a sheet metal chamber 37 of substantially the same size and shape as one of the rectangular frames 10 forming the table 9 and supported in any suitable manner upon a frame work 38 indicated in Fig. 2. This pan or chamber 37 is preferably provided with perforations 39 through which air may be admitted to said chamber and extending lengthwise of the chamber are gas burners 40 of any approved type, said burners being shown in Figs. 1 and 2 being controlled by a valve or cock 41.

Arranged in any suitable position and location with respect to the pedestal 1, is a power driven fan 42 to which is connected a pipe 43 terminating in branches 44, 45 and 46, said branches having their ends directed upwardly and terminating at a short distance below the table 9. These branches 44, 45 and 46 are preferably arranged so as to be in registration with the center of the three frames 10 which are not in registration with the chamber 37 of the heater. Said branches 44, 45 and 46, may each be provided with a damper or valve 47 by means of which the amount of air allowed to pass through that branch may be controlled and regulated.

Thus by the above arrangement, one frame 10 and the parts or articles supported or mounted thereon may be heated to any desired degree by the burners 40, while simultaneously, the other three frames 10 are being cooled by a blast of air directed against the same by the branches 44, 45, and 46 and the table is held in such position as long as is desired by the engagement of the dogs 27 with the side of the table.

The operation of the apparatus above described is as follows:

The gas burners 40 being lighted, a mold or pan 12 is placed upon the supporting screws 23 and in a position that the bottom of the said pan 12 will be raised a little above the top of the table to allow for egress from under the table and under the pan of the gases of combustion. An electrotype or shell 48 is then placed within the pan face downward, as illustrated in the pan shown at the left of Fig. 4, said shell 48 having applied to its back or upper side a suitable metallic flux. The heating is continued until the pan or mold 12 and the electrotype or shell 48 is heated sufficiently to melt the flux on the back of it, whereupon the operator presses the pedal 35 to throw the dogs 27 downwardly clear of the bottom of the table and then gives the table a quarter turn. This brings the pan which was before located to the left of Fig. 4 over the discharge end of the branch pipe 44, and air passing through the pipe 44 begins to cool the mold and contents. Of course, the pan and mold are previously heated to a relatively high temperature and the air passing through the branch 44 acts at first slowly on the pan and its contents. After having been brought to this position, the operator immediately pours molten metal 49 over the back of the electrotype and filling the mold therewith as indicated in the pan to the right hand side of Fig. 4. Meanwhile the operator places another electrotype or shell 48 having its back provided with a suitable flux in the empty pan now over the burners 40. Of course, the constant discharge of air through the branch pipe 44 against the bottom of the pan which now contains the electrotype or shell covered with molten metal, begins to cool the same and this continues until the pan and shell over the burners 40 is heated sufficiently. The operator then again presses on the pedal 35 and gives the table the next quarter turn. This brings the shell which was previously heated directly over the branch pipe 44 and the operator immediately fills that mold with molten metal 49, placing a third pan with a third electrotype or shell with flux on the back over that portion of the table in registration with the burners. The pan which was last filled with molten metal by the operator has, however, been moved over the branch pipe 45 and the air from the fan 42 continues to be discharged against the bottom of the pan further cooling it. At this point then, one electrotype or shell is being heated, a second is being cooled over the branch pipe 44, while the third is being still further cooled over the branch pipe 45.

The operator then again presses the pedal 35, giving the table the third quarter turn. This operation brings the electrotype last heated in position over the branch pipe 44, whereupon the operator fills that mold as heretofore described, after which he places the fourth pan on the table over the burners with the electrotype or shell lying on the bottom of it as heretofore described. This fourth shell is heated as were the three previous shells before described. At this point then, one electrotype or shell is being heated, the second has just been filled with molten metal and is being cooled over the branch pipe 44, the third is being cooled over the branch pipe 45, while the fourth or first electrotype or shell described is being cooled sufficiently over the branch pipe 46 to permit of the removal of the pan or mold from the table and of the backed electrotype from the mold or pan. By the time that the fourth shell or electrotype has been sufficiently heated, the pan which was then over the branch pipe 46 will be cooled sufficiently to permit of its removal from the table and a new pan containing an electrotype or shell having flux on the back is substituted therefor, generally speaking, by a second operator.

From this time on then, the operation is continuous. The first operator will heat the electrotype or shell in the mold or pan at the left of the front of the table and fills the mold or pan which is nearest the melting pot as soon as the table is swung to bring the heated electrotype or plate over the branch pipe 44. An operator on the back side of the machine will remove the pan from over the branch pipe 46 and remove the backed electrotype from that pan, replacing it with an empty pan or mold ready to be brought upon the next quarter turn of the table into registration with the burners 40.

The operation of the mechanism is continuous and it may be substantially operated just as fast as the operator at the front of the machine can keep that mold which is on the front of the machine nearest the melting pot filled with molten material and place in the pan or mold to the left of the machine a new electrotype provided with flux on its back on the bottom of the empty mold over the burners. The amount of air which is allowed to pass through the pipes 44, 45, and 46 may be regulated and controlled by the dampers 47 to bring the temperature of the backed electrotype over the branch pipe 16 down to a temperature which will permit of its handling.

My improved method of backing electrotype shells involves a number of steps, the performance of which is considerably facilitated by the use of the apparatus above described. The first steps in the process are to clean the electrotype and then place upon the back of it a suitable metallic flux, such, for instance, as tin foil. After this has been done, the operator puts the electrotype shell, with the flux on the back of it, in the mold with the face of the electrotype resting against the bottom of the mold. The mold and the electrotype contained therein are then "dry heated" to a degree sufficient to melt the flux on the back of the electrotype. By "dry heating" is meant the heating of the electrotype by the combustion of gas or other suitable fuel, as distinguished from heating the same by liquid or fluid medium, such as molten metal. After the mold and electrotype therein have been heated to the desired degree, molten metal is then poured in the mold so that the stream of metal falls upon the back of the shell. By introducing the molten metal in this manner, the thin electrotype shell will be firmly held down upon the bottom of the mold during the filling of the mold by reason of the molten metal falling upon it. If the metal were to be introduced in any other manner, the shell would tend to float on the surface of the molten metal unless held down by extraneous means, and the very purpose of the above described treatment of the shell would be defeated.

As soon as the mold has been filled with molten metal, the same is subjected to a cooling process whereby the molten metal is changed from the fluid to the solid state. As a matter of fact, this cooling treatment is preferably continued after the metal has solidified or until the backed electrotype is cool enough to permit of its being handled or removed from the mold and finished. The dry heating is preferably effected by heating the mold with the electrotype therein over a gas burner, such as is shown in the apparatus described and the cooling of the mold and of the backed electrotype formed therein is preferably effected by successively bringing the mold and its contents over the discharge end of air blast pipes, such as have been previously described in connection with the apparatus illustrated in the drawings of this application. This process of backing electrotype shells is also included in and forms a part of this description.

Having thus described my invention, I claim:

1. In an apparatus for backing electrotype shells, the combination with heating means, of cooling means substantially circularly disposed with respect to each other, and in series with said heating means, molds for casting said backing, and a rotatable table for said molds, arranged to be intermittently rotated to present the respective molds into operative relation with the heating means and with the cooling means.

2. In an apparatus for backing electrotype shells, the combination with a rotatable table, stationary heating means disposed beneath a portion of said table, a plurality of cooling means suitably spaced under said table and disposed in a substantially circular path in series with said heating means, and molds supported on said table, said table having openings registerable with said heating and cooling means over which said molds are supported, the rotation of said table operating to successively bring said molds into operative relation over said heating and cooling means.

3. In an apparatus for backing electrotype shells, the combination with a table provided with a plurality of spaced apertures disposed in a substantially circular path, of heating means under said table and in registration with one of said apertures, pipes for conveying a cooling medium in registration with the other of said apertures, and molds for casting the backing of said shells removably engaged in said openings, said table being intermittently rotatable to successively present said molds into operative relation with the heating and cooling means.

4. In an apparatus for backing electrotype shells, the combination with a rotatable table, of heating means mounted beneath said table, a pipe for supplying air having branches discharging upwardly under said table, and molds for casting said backing, said table comprising a plurality of rectangular rotatable frames, one end of each frame lying along the side of the adjacent frame, the rotation of said table operating to successively bring said molds into operative relation with said heating means and over the ends of said branches.

5. In an apparatus for backing electrotype shells, the combination of a rotatable table provided with four apertures, a mold mounted over each aperture in said table, heating means beneath substantially one quarter of said table, three cooling means, one under each of the three remaining quarters of said table, means to hold said table locked from rotation with respect to said heating and cooling means, said heating and cooling means each being under a different quarter of said table and directly under a different mold, a melting pot adjacent one side of said table when in locked position, and means to release said locking means to permit of the rotation of said table through substantially one quarter of a complete revolution.

6. In an apparatus for backing electrotype shells, a heater, a rotatable table over said heater, a mold supported on said table over said heater, and cooling means also under said table operative to cool that portion of the table above said cooling means, the movement of said table from a position in which said mold is over said heater, through a quarter revolution being operative to bring said mold over the first of said cooling means and adjacent said melting pot; the rotation of said table through a second quarter revolution being operative to bring said mold over a second cooling means; the rotation of said table through a third quarter of a revolution being operative to bring said mold over a third of said cooling means and the rotation of said table through a fourth quarter of its revolution or back to its original position, being operative to bring said mold over said heater.

7. In an apparatus for backing electrotype shells, the combination of a table comprising four rectangular frames each frame being provided with a square extension projecting from a corner of a long side thereof and forming an extension of the short side thereof, said four frames being fitted together with the short side of one frame abutting against the long side of the adjacent frame and the end of the said projection on one frame abutting against the side of the similar projection of the adjacent frame, said frames so assembled forming a square table with four rectangular openings therein, and a vertical rotatable shaft to which said frames are firmly secured.

8. In an apparatus for backing an electrotype shell, the combination of a table comprising four substantially rectangular frames, the short side of each frame being extended outwardly from the long side of said frame to form a square projection, said extended short side of each frame abutting against the long side of the adjacent frame and the end of the square projection on each frame abutting against the side of the projection of the adjacent frame, the said short extended side of each frame being provided with a supporting ledge, and the long side of each frame terminating in said projection being provided with an overhanging ledge whereby the long side of each frame rests upon and is supported by the ledge projecting from the adjacent short side of the adjacent frame, and a rotatable vertical shaft and bolts passing through said square projections for rigidly securing said frames to said shaft.

9. In an apparatus for backing electrotype shells, a table comprised of four frames, each frame being rectangular in shape and having a square extension projecting outwardly from an end of a long side thereof, the said long side of said frame which terminates in said square extension, being provided with an overhanging flange, and the short side of said frame which terminates in the said square extension being provided with a supporting flange, said short extended side of each frame being provided with a longitudinal rib or ledge.

10. In an apparatus for backing electrotype shells, the combination of a melting pot adapted to contain molten backing metal, a mold adapted to receive an electro-type shell to be backed and a support for this mold upon which it is moved into position alongside the melting pot to receive the backing metal therefrom and whereby it is held stationary in such position until the required quantity of backing metal has been received by the mold.

11. In an apparatus for backing electrotype shells, the combination of a melting pot adapted to contain molten backing metal, a mold adapted to receive an electro-type shell to be backed and a support for this mold upon which it is moved into position adjacent to and above the melting pot to receive the backing metal therefrom and whereby it is held stationary in such position until the required quantity of backing metal has been received by the mold.

In witness whereof, I have hereunto set my hand this 6th day of December, 1913.

JAMES F. GOUNLEY.

Witnesses:
KATHARINE BUTZ,
ALSTON B. MOULTON.

Copies of this patent may be obtained for five cents each, by addressing the "Commissioner of Patents, Washington, D. C."